United States Patent [19]

Campbell et al.

[11] Patent Number: 4,670,798

[45] Date of Patent: Jun. 2, 1987

[54] POINT OF PURCHASE ADVERTISING SYSTEM

[75] Inventors: Max L. Campbell, 5109 Brentwood Rd., Topeka, Kans. 66606; Jerome A. Flesher, Topeka, Kans.

[73] Assignee: Max L. Campbell, Topeka, Kans.

[21] Appl. No.: 851,913

[22] Filed: Apr. 14, 1986

Related U.S. Application Data

[63] Continuation of Ser. No. 778,283, Sep. 20, 1985, abandoned, which is a continuation of Ser. No. 536,689, Oct. 28, 1983, abandoned.

[51] Int. Cl.[4] ........................ G11B 5/02; G11B 31/00; G11B 19/08

[52] U.S. Cl. ........................................ 360/12; 369/19

[58] Field of Search .................. 360/12, 74.4; 369/19, 369/20; 367/93

[56] References Cited

U.S. PATENT DOCUMENTS

| | | | |
|---|---|---|---|
| 2,152,296 | 3/1939 | Weis et al. | 369/20 |
| 2,552,788 | 5/1951 | Hoover | 369/19 |
| 2,595,993 | 5/1952 | Templeman et al. | 369/19 |
| 2,909,765 | 12/1955 | Humes, Jr. et al. | 360/12 |
| 3,509,288 | 4/1968 | Leventhal | 360/12 |
| 3,696,358 | 10/1972 | Vasku | 360/12 |
| 3,825,947 | 7/1974 | Rubin et al. | 360/12 |
| 3,863,196 | 1/1975 | Hilles | 367/93 X |
| 3,893,094 | 7/1975 | Thorson et al. | 367/93 |
| 3,922,629 | 11/1975 | Hayakawa | 367/93 X |
| 4,054,924 | 10/1977 | Zimmerman | 360/74.4 |

OTHER PUBLICATIONS

Intrusion Protection by F. S. Buckley, Electronic Technician pub., Jul. 1964, pp. 45-46.

P. W. Bond "Jingle Machine" Practical Wireless, vol. 52, No. 5, Sep. 1976, pp. 401-404 and 442.

*Primary Examiner*—Raymond F. Cardillo, Jr.
*Assistant Examiner*—Alyssa H. Bowler
*Attorney, Agent, or Firm*—Schmidt, Johnson, Hovey & Williams

[57] ABSTRACT

A point of purchase advertising system is provided which senses the presence of a person in the vicinity of an advertising display and thereupon renders an appropriate advertisement such as a recorded verbal message or a visual or aural demonstration. In preferred forms, the overall apparatus includes an ultrasonic sensing circuit for detecting the approach of a potential customer, an advertisement giving device, typically an endless tape playback unit and a coupled speaker, and a controller for operation of the playback unit in response to detection of a customer. A voice operated relay circuit is advantageously coupled with the audio output of the playback unit and the playback controller, so that operation of the playback unit is maintained until the entire recorded advertisement has been given.

4 Claims, 1 Drawing Figure

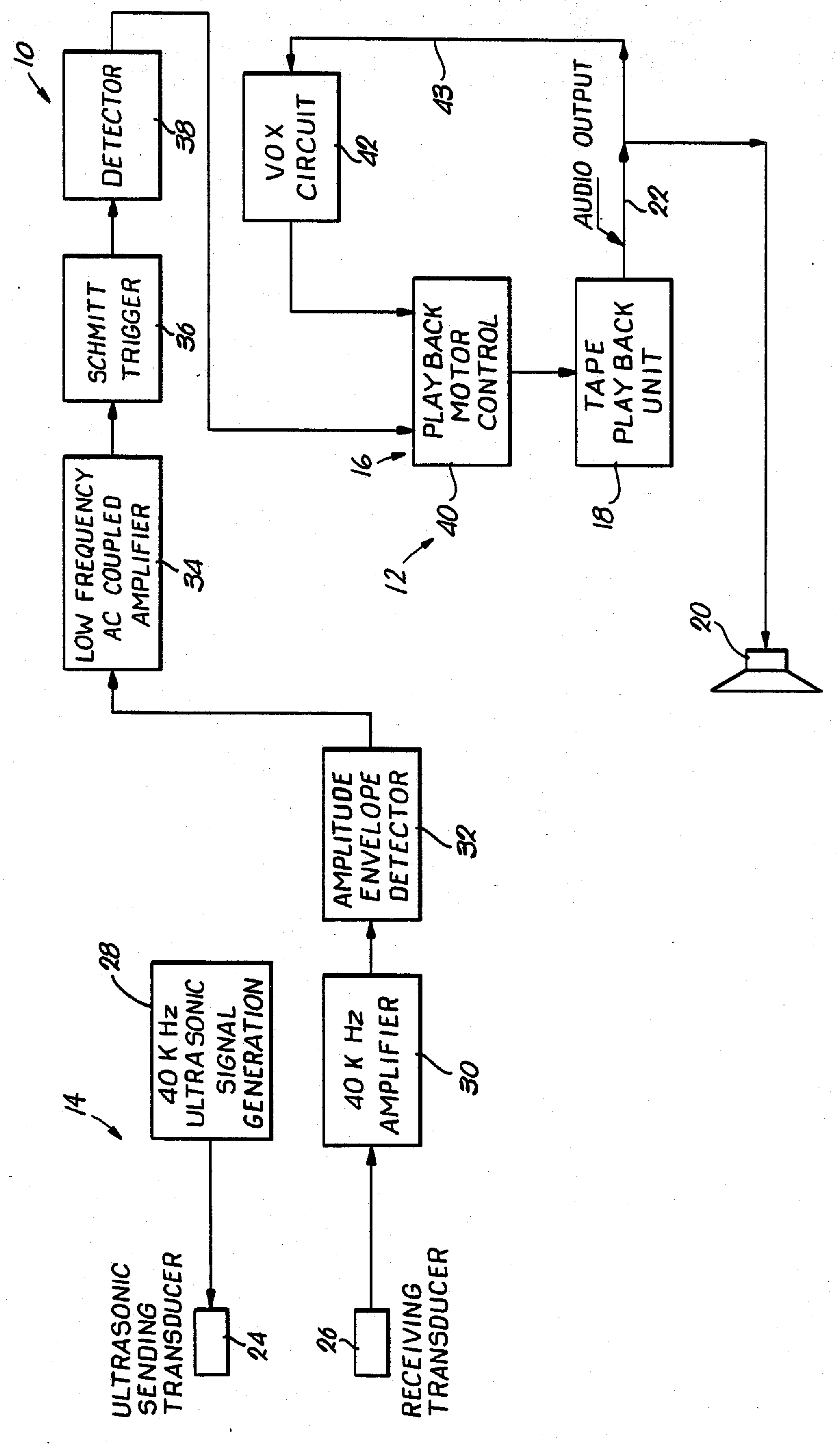
DETECTOR
SCHMITT TRIGGER
LOW FREQUENCY AC COUPLED AMPLIFIER
VOX CIRCUIT
PLAYBACK MOTOR CONTROL
TAPE PLAYBACK UNIT
AUDIO OUTPUT
AMPLITUDE ENVELOPE DETECTOR
40 K Hz ULTRASONIC SIGNAL GENERATION
40 K Hz AMPLIFIER
ULTRASONIC SENDING TRANSDUCER
RECEIVING TRANSDUCER
10
38
36
34
42
43
22
16
40
12
18
20
32
28
14
30
24
26

POINT OF PURCHASE ADVERTISING SYSTEM

This application is a continuation of application Ser. No. 06/778,283, filed 9/20/85, which was a continuation of Ser. No. 06/536,689, filed 10/28/83, both now abandoned.

BACKGROUND OF THE INVENTION

1. Field of the Invention

The present invention is broadly concerned with a point of purchase advertising system which gives selective, repeated advertising messages in the form of verbal or other types of advertisements in response to the approach of a potential customer, all without the need for operator assistance. More particularly, it is concerned with such a point of purchase advertising system which is essentially portable in nature and can be positioned at virtually any strategic sales location in order to render valuable advertising services.

2. Description of the Prior Art

It is estimated that up to 70% of all retail sales are made at the so-called "point of purchase"; in other words, the great majority of consumer purchases are made on the basis of immediate impression and impulse. This is a primary reason one encounters a bewildering array of advertising and promotional material in retail outlets such as grocery, hardware or other retail sales establishments.

Obviously, in order for any point of purchase advertising system to be effective, it must create an arresting impression. For this reason, innumerable advertising ploys, promotions and techniques have been attempted in the past in order to increase sales. Such include brightly colored posters, giveaways, coupons, product demonstrations and even the presence of live salesmen. The latter alternative is of course very effective, but generally speaking the cost of providing a live salesman is prohibitive, particularly in the case of relatively low cost consumer items.

Accordingly, there is a need in the art for an effective point of purchase advertising display system which has the advantages of a live salesman or demonstration but at relatively low cost.

SUMMARY OF THE INVENTION

The problems outlined above are in large measure solved by the present invention which provides a point of purchase advertising system broadly comprising means for selectively and repeatedly giving a desired advertisement such as a recorded verbal message, visual demonstration or even an aural sensation. In addition, the system includes means for sensing the presence of a person in the vicinity of the advertisement-giving means, including an ultrasonic sending transducer and a spaced receiving transducer. Finally, the overall system includes means operably coupling the sensing means and advertisement-giving means, including control means for operation of the latter, in order to give an advertisement in response to the detection of a person by the sensing means.

In particularly preferred forms, the overall system includes structure operably coupling the advertisement-giving means and the control means for maintaining the operation of the advertising means until the complete advertisement has been given.

In one form of the invention, an endless tape playback unit and a coupled speaker are provided for giving verbal advertising messages. In this event, the operation of the playback unit is maintained after initiation thereof by means of a voice operated relay circuit operably coupled with the audio output of the playback unit and the control means for the playback unit.

While the invention is illustrated in connection with a tape playback unit giving a verbal advertising message, it is so limited. That is to say, virtually any type of desired interactive advertising can be given using the invention; indeed, this aspect of the invention is limited only by the imagination of the user.

BRIEF DESCRIPTION OF THE DRAWING

The single FIGURE is a schematic block diagram illustrating the components and circuitry associated with the point of purchase advertising system of the invention.

DESCRIPTION OF THE PREFERRED EMBODIMENT

Turning now to the drawing, a point of purchase advertising system 10 is schematically illustrated. Broadly speaking, the system 10 includes means 12 for selectively and repeatedly giving a desired advertisement, means referred to by the numeral 14 for sensing the presence of a person in the vicinity of the advertisement-giving means 12, and means 16 operably coupling the sensing means 14 and the advertisement-giving means 12.

In more detail, the advertising-giving means 12 includes a conventional tape playback unit 18 equipped with an endless tape bearing an advertising message, along with an audio speaker 20 operably coupled to the output 22 of the unit 18.

The sensing means 14 includes a pair of transducers, namely an ultrasonic sending transducer 24 and a spaced receiving transducer 26. The transducer 24 is driven through the medium of a signal generator 28, and the output of the transducer 26 is coupled to an amplifier 30. The amplifier 30 is in turn coupled with an amplitude envelope detector 32, with the latter being in turn connected to a low frequency AC coupled amplifier 34. The output from the amplifier 34 is connected to a Schmitt trigger circuit 36, and the output from the latter is coupled w a detector 38, the magnitude of the direct current voltage output of which is representative of variations in the amplitude of the ultrasonic signals received by the receiving transducers 26.

The coupling means 16 includes a playback motor control 40 which is in turn connected to playback unit 18 for turning the latter on and off.

A voice operated relay circuit 42 has its output coupled to playback motor control 40, and is actuated by audio signals received via line 43 from the audio circuit portion of the unit 18 (a microphone or other audio receiving transducer for picking up sounds emanating from the speaker 20 once the unit 18 has started to play could alternately be used).

In addition to the components depicted in the FIGURE, those skilled in the art will readily appreciate that other conventional circuitry would normally form a part of the overall apparatus. To give but one example, the power supply (not shown) could be operably coupled to the components requiring such power, i.e., the signal generator 28, amplifiers 30, 34 and playback unit 18.

In the use of system 10, the 40 kilohertz ultrasonic signal generator 28 is energized in order to generate appropriate ultrasonic signals through transducer 24. There are numerous paths the ultrasonic signals may take in passing from the sending transducer 24 to the receiving transducer 26, and each such path will contribute to the output amplitude of the transducer 26. Since each signal path may be of a different length, each signal, as it is received by the transducer 26, will have a unique phase relationship to the transmitted signal. The output signal from the receiver transducer 26 is the sum of the combined signals from all paths. Therefore, when the path lengths are essentially unchanging (i.e., when there is no movement within the range of the transducer device), the output signal is constant. On the other hand, as a person enters the vicinity of the transducers, some path lengths change or new paths are added, and the transducer output amplitude will accordingly vary.

The output from the transducer 26 is first amplified to a usable level by means of the 40 kilohertz amplifier 30, whereupon the amplified ultrasonic signal is rectified by the envelope detector circuit 32. The output from the detector circuit 32 is a DC voltage, the magnitude of which represents the amplitude of the received signal The DC signal from detector circuit 32 is then directed to the low frequency AC coupled amplifier 34 in order to amplify the variations in amplitude of the incoming signal and provide a DC control voltage output when the input amplitude variations are sufficiently high (indicating a moving person in the field of the transducers) The output voltage is suitable for driving the motor control circuit 40. The Schmitt Trigger circuit provides DC blocking so the amplifier is not sensitive to the absolute magnitude of the signal, but only to changes in the magnitude. The output from detector 38 controls a switching circuit in control 40 which turns on power to the drive motor of the tape playback unit.

When the recorded message begins to play, the VOX circuit 42 amplifies the recorded audio signal and converts the signal to DC voltage. This DC voltage also operates the switching circuit which powers the tape playback drive motor. Therefore, once the message has begun to play, the VOX circuit will keep the recorder motor running until there is no longer any audio signal coming from the playback unit. Once the recorded message has finished playing and after a delay of approximately ten seconds, the playback unit will turn off unless there is a further motion detected by the ultrasonic portion of the circuit

We claim:

1. An announcement system, comprising:
   means for selectively and repeatedly giving desired announcements; and
   motive means operably coupled with said announcement-giving means for operation thereof to give said desired announcements in their entirety,
   said motive means including—
      actuator means for re-actuating said announcement-giving means following each completion of an announcement by the announcement-giving means and only in response to ongoing movement of a person within a region adjacent the announcement-giving means;
      apparatus for preventing said re-actuation of the announcement-giving means during a pause of predetermined duration immediately following completion of each announcement, whereby to provide time for a person having just received the announcement to leave the region without re-actuating the announcement-giving means,
   said actuator means being operable to re-actuate said announcement-giving means only during a functional time period of variable duration between said pause and commencement of the next announcement;
   ultrasonic sending transducer means operable for sending ultrasonic signals into said region, said signals after said sending thereof being alterable by ongoing movement of a person within the region;
   ultrasonic receiving transducer means operable for receiving ultrasonic signals from said sending transducer means, and for generating output signals in response to said receipt of said ultrasonic signals,
   said output signals having varying ampltiudes when a person is moving within said region and the receiving transducer means receives altered ultrasonic signals, as compared to the constant amplitude of the output signals when no person is moving within the region and the receiving transducer means receives unaltered ultrasonic signals,
   said actuator means being operably coupled with said receiving transducer means and said announcement-giving means for re-actuating the announcement-giving means only in response to the amplitude variations of output signals, resulting from ongoing movement of a person within said region being sufficiently high during said functional time period of the actuator means,
   said actuator means being disposed for preventing operation of the announcement-giving means in response to the constant amplitude output signals resulting from no movement of a person within said region during the functional time period of the actuator means, or resulting from amplitude variations which are sufficiently high but do not occur during said functional time period of the actuator means; and
   structure for maintaining the operation of said announcement-giving means after initiation of operation thereof for a period of time until a desired announcement is completed.

2. The system of claim 1, said announcement-giving means including a tape playback unit, playback motor control coupled with said playback unit, and speaker means operably coupled with said playback unit.

3. The system of claim 2, said operation-maintaining structure including a voice operated relay circuit operably coupled with the audio output of said playback unit and said playback motor control.

4. The system of claim 1, said actuator means including—
   a Schmitt trigger operably coupled with said receiving transducer means; and
   detector means operably coupled with said trigger and said announcement-giving means.

* * * * *